Oct. 2, 1934.   H. HALPERIN ET AL   1,975,602
INSULATING SLEEVE FOR LEAD COVERED CABLES
Filed Feb. 3, 1927    2 Sheets-Sheet 1
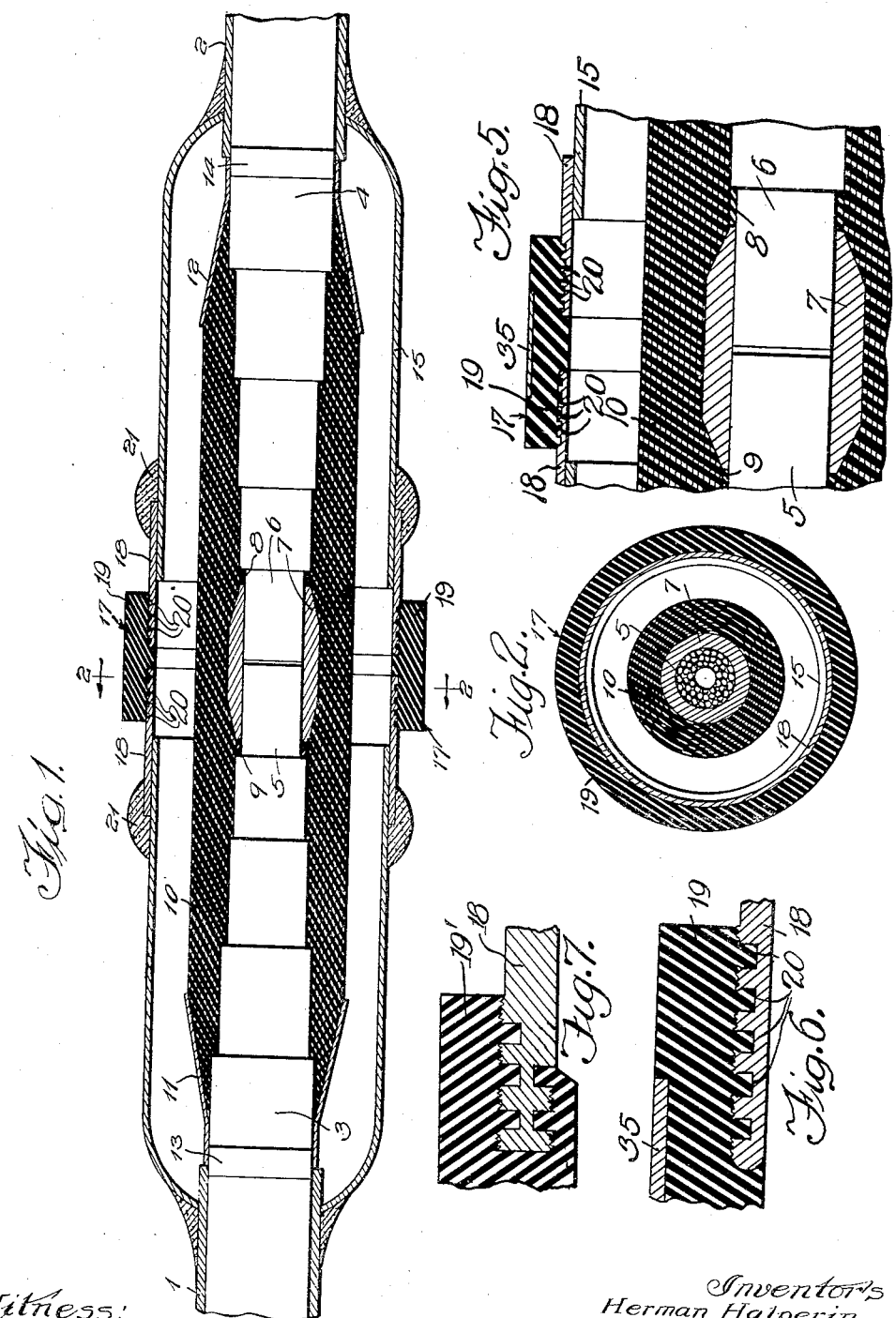
Witness:
William P. Kilroy
Inventors
Herman Halperin
Alexander P. Thoms
By Brown Boileau Donnelly
Attys

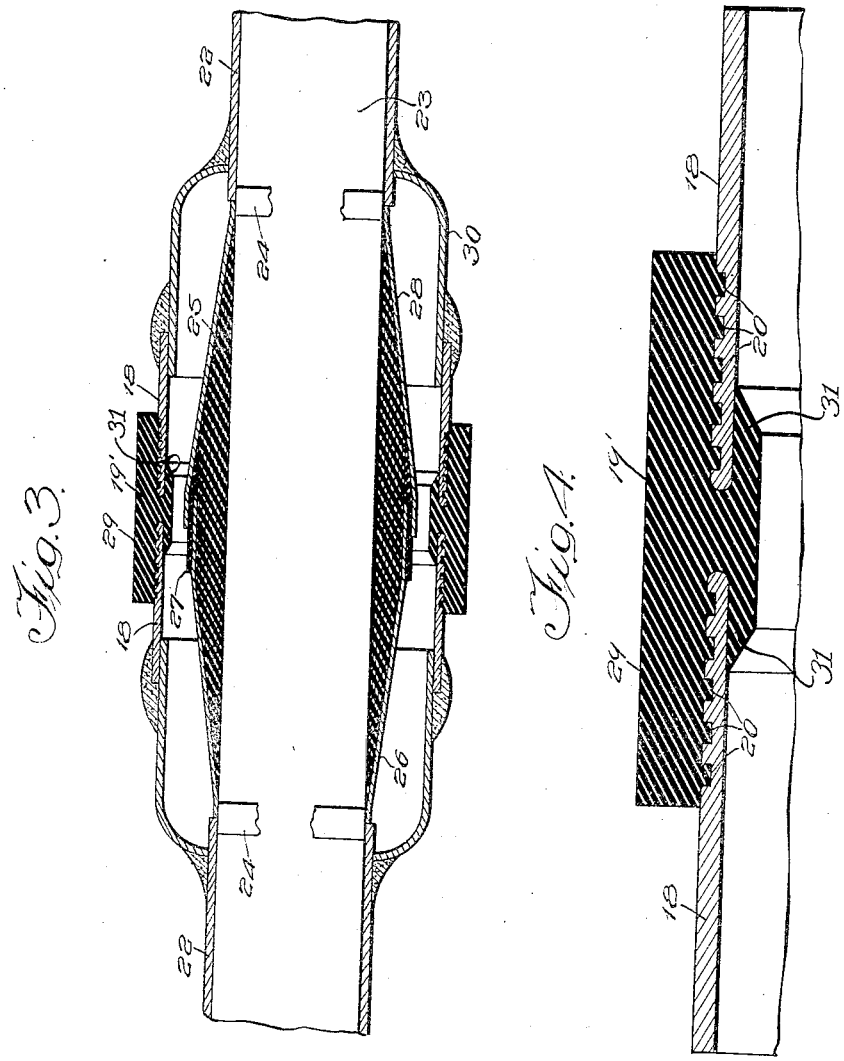

Patented Oct. 2, 1934

1,975,602

UNITED STATES PATENT OFFICE 1,975,602

INSULATING SLEEVE FOR LEAD COVERED CABLES

Herman Halperin and Alexander P. Thoms, Chicago, Ill.

Application February 3, 1927, Serial No. 165,566

7 Claims. (Cl. 173—268)

Our invention relates to electric power cables and more particularly to the sectionalizing of the metal cable sheath to reduce or minimize the effect of induced sheath voltages. Where the three conductors of a three phase underground line are cabled within a single metallic sheath, the electromotive forces which tend to be induced by the flow of alternating current are on a balanced system substantially balanced out, and the sheath electromotive forces and consequent losses are not of material consequence. Hence sectionalizing of the lead sheath in a three phase power cable is not generally considered necessary.

Where the line comprises individual or single conductor cables as, for example, three single conductor cables in a three phase underground line, the sheath of each individual conductor tends to develop an electromotive force per unit of length which depends primarily upon the current carried in the conductor. In a run of cable of considerable length where the sheath is not interrupted, the cumulative electromotive force may rise to a considerable value. If, then, the several cables of a three phase line have their lead sheaths connected at more than one point, a current will flow resulting in heat losses. If these heat losses can be eliminated the carrying capacity of the cable can be increased materially.

It has heretofore been proposed to interrupt the conductivity of the sheath by the insertion of insulating sections, and to make the connections of the sections of lead sheath in such manner as to balance out induced electromotive forces, so as to minimize the current flow in the sheath and the resultant heat losses.

It is an object of this invention to provide a suitable means for interrupting electrically the metallic sheath to secure the desired connections, so that the aforesaid losses may be minimized or avoided.

Such interruption must leave the cable sheath fluid tight under all operating conditions and must be strong enough to withstand the electrical and mechanical loads that may be imposed without yielding or leaking. It must also be permanent, i. e., resistant to the action of the air and liquids, such as water, weak acids, alkalis, and the various agencies that operate upon the cable sheath.

According to our invention we provide as an article of manufacture an insulating sleeve comprising a pair of like cylindrical thimbles or sleeves bonded to each other mechanically, but separated electrically by a body of insulation formed in place. In the preferred embodiment of our invention the body of insulation consists of a ring of synthetic phenol resinous product, formed in place upon the ends of two similar brass sleeves. The matter of securing a tight fit between the insulating material and the metal is a feature of our invention.

The insulating sleeve thus constructed may form a part of the lead sleeve usually employed to cover the joint, between sections of cable, or it may be made a part of the lead sheath outside the joint.

Another feature of the invention comprises the provision of a ground screen within the insulating sleeve to preserve a proper distribution of the electrostatic stresses and, at the same time, interrupt electrically the conductivity of the sheath.

Now in order to acquaint those skilled in the art with the manner of constructing and operating a device embodying our invention, we shall describe in connection with the accompanying drawings a specific embodiment of the same.

In the drawings:—

Figure 1 is a longitudinal vertical section of a joint embodying our invention;

Fig. 2 is a cross section of the same taken on the line 2—2 of Fig. 1;

Fig. 3 is a section like Fig. 1 of a joint in the lead sheath outside of the cable joint;

Fig. 4 is an enlarged sectional view of the sleeve of our invention;

Fig. 5 is a fragmentary section similar to Fig. 1 showing a modified form of the sleeve of our invention.

Figure 6 is an enlarged detail section of the sleeve shown in Figure 5, and Figure 7 is an enlarged fragmentary detail section of another modification.

In Figure 1, we have shown a cable joint in which the insulating sleeve of our invention is embodied. The adjacent ends of the cable sections 1 and 2 have the lead sheath removed therefrom and the paper or other insulation tapered off from the full thickness as indicated at 3 and 4 down to the bare copper shown at 5 and 6. A copper sleeve 7 is joined to the bared ends of the conductor, which are preferably previously tinned to facilitate the operation.

A filling of cotton yarn as indicated at 8 and 9 is applied to the bared ends 5 and 6 between the adjacent ends of the original cable insulation and the joining sleeve 7.

It is apparent that the original cable insulation may be tapered off in a smooth conical taper, except that such operation is more difficult to per-form, and the stepping arrangement appears to work equally well.

The hand wrapping 10 is then applied over the sleeve 7, the filling of yarn 8 and 9, and the stepped ends of the cable insulation to build up a satisfactory body of insulating material. This hand wrapping comprises in the joint illustrated varnished cambric tape from ¾ to 1 inch wide, preferably treated with an insulating compound before its application to eliminate voids and to increase the electrical strength of the hand wrapped insulation.

It will be observed that the hand wrapped insulation 10 is extended over a part of the original cable insulation 3, 4 at the ends, and thereafter the grounding shields 11, 12 are applied at the ends of the cable sheath. These grounding shields are made preferably by wrapping a relatively narrow flexible copper braid as, for example, ¼ inch copper braid about the original cable insulation in contact with the adjacent ends 13 and 14 of the lead sheath and extended on over the hand wrapped insulation as shown in Figure 1.

Electrically this becomes a continuation of the lead sheath and, obviously, if the joint is to be an insulating joint, that is, a joint in the sheath separating two parts electrically, this grounding screen must not be continuous from end to end electrically. However, it is desirable that the shielding effect across the insulation be substantially continuous and that concentrated stresses be avoided. We have shown in Figure 3 how this may be accomplished within the outer lead sleeve by telescoping the ends of the grounding screen and interposing insulation of an order high enough to insulate the sheath sections from each other.

The joint thus far described is enclosed in an outer sleeve 15 preferably made of two sections of lead tubing joined by the insulating joint 17 of our invention. This insulating joint comprises two brass sleeves or ferrules 18, 18 with a ring 19 formed of a phenol condensation product and molded in place upon the ends of these brass ferrules. This insulating ring 19 is composed of a material at present designated in the trade as compound #AM-252, and comprises mainly asbestos and a phenol condensation product.

An important feature of this joint is the matter of securing a fluid tight bond between the insulating ring 19 and the brass thimbles 18. In the present case this is secured by cutting a plurality of grooves 20 in the exterior surface of the brass thimbles 18 and molding the ring 19 in place thereupon.

We have found that the character of this bond may be improved by knurling the tops of the circular ridges which lie between the grooves 20.

The entire surface in contact with the phenol condensation product ring 19 may be knurled, if desired. It appears that this knurling in conjunction with the grooved anchoring of the thimbles 18 in the ring 19 gives an intimate contact between these parts which is not broken under the conditions of use to which the device is subjected.

The material which we use has a high dielectric strength of the order of 200 volts per mil in thickness. It is relatively non-hygroscopic and absorbs very little moisture. An important feature of the construction is the ability to remain fluid tight under all changes in temperature to which the cable may be subjected within its operating range. We find that the coefficient of expansion of the insulating ring 19 is approximately .000025, whereas the coefficient of expansion for brass is of the order of .000020 inches per degree rise centigrade. From this it may be seen that there is very little tendency for the meeting surfaces of the phenol condensation product and of the brass rings to separate, and in practice we find that these surfaces form an excellent seal.

The brass thimbles 18, 18 are joined to the lead sleeve 15 by wiped solder joints as indicated at 21, 21 in Figure 1.

The adjacent ends of the brass ferrules 18, 18 are preferably rounded to avoid potential stresses.

The lead sleeve 15 with the insulating joint joined thereto by the joints 21, 21 is preferably slipped over one end of the cable before the joint is made, and is thereafter moved into place and wiped to the original lead sheath 1, 2 of the adjacent cable end, and thereafter it is filled with an insulating compound which may be a liquid or semi-liquid, or other compound, as may be desired.

While it is preferable to make up the insulating joint in place in the outer lead sleeve 15 before inserting the same over one end of the cable in the interests of saving time, it is within our invention to make said joints 21, 21 in place when the joint is made on the cable end.

While we have shown above the insulating sleeve of our invention as inserted in the lead sleeve joining the cable sheath of adjacent lengths of cable, it is to be understood that our joint may be interposed in the cable sheath at any desired point, and we have shown in Figure 3 the manner in which this may be accomplished. In this construction the lead sheath is removed from a part of the insulation 23 of the cable for the purpose of interrupting the same electrically. Thereafter, the copper sheath band 24 is slipped under the end of the lead sheath on the outside of the insulation 23. Then a reenforcing insulation of hand wrapped tape 25 is applied over the original insulation 23 to reenforce the original insulation. A grounding screen made up of copper braid is then wrapped over the reenforcing insulation 25 in two sections. The section 26 is first applied beginning with the copper sheath band 24 by which this grounding screen is put into good electrical connection with the end of the cable sheath 22, then the copper braid is wrapped in place over the reenforcing insulation 25 to a point approximately slightly beyond the center of the joint. Then a few layers of insulating tape, such for example, as varnished cambric tape, are applied at 27 over the end of the first section of grounding screen 26 and thereafter the second section of the grounding screen is applied as indicated at 28. Both sections of the grounding screen are preferably made of ¼ inch copper braid, the consecutive convolutions of which are soldered together on opposite sides or at a plurality of points to insure good electrical conductivity throughout. The two adjacent overlapping ends of the sections 26 and 28 are separated by insulation, but form a complete grounding screen over the entire joint. The ends of the lead sheath 22—22 are joined by an insulated lead sleeve 30 containing an insulating joint 29 of our invention therein.

This joint likewise comprises the brass sleeves or ferrules 18—18 joined by a body 19' formed of a phenol condensation product, these parts being bonded together by grooves and knurling, as previously described. In the present instance, however, the body of phenol condensation product is extended to overlap the inside edges of the ferrules 18—18 as indicated at 31.

Both sides, that is, the inside and the outside of adjacent ends of the ferrules 18—18 may be grooved, or grooved and knurled, as shown in Figure 7, so that any tendency for the brass sleeves to leave contact with the phenol condensation product body 19' on their exterior surface will be compensated by a tendency to engage more firmly with the inner portion of the phenol condensation product body 19' on the inner surfaces of said brass thimbles.

The structure of grounding screen shown in Figure 3 may be employed in the joint shown in Figure 1, if desired, or the grounding screen may be built up only over the shoulders of the hand wrapped insulation and a brass ring set in the outer surface of the phenol condensation product ring 19, although this is not necessary, particularly where the usual fire proofing comprising a wrapping of rope and a coating of cement is applied over the entire joint.

In Figure 5 we have shown a modified form of the sleeve in which a metallic ring 35 is set into the outer periphery of the insulating ring 19. This ring 35 serves to bridge the gap between the rings 18, 18 by providing a ground shield between the ends of rings 18, 18. The ring 35 also provides an element of strength by reenforcing the insulating ring 19. The bond between the ring 35 and ring 19 does not need to be fluid tight. If desired, the ring 35 may extend the full length of ring 19.

The exposed ends of the brass thimbles 18—18 are preferably tinned to resist corrosion and to assist in making the wiped solder joint.

While the insulating joints of our invention are, under test, tight against fluid pressure when they are taken out of the molding dies and cooled, we have instances in which a slight leakage could be detected. In general, the shrinking of the insulating material onto the brass thimbles makes a tight joint because the insulating material is molded at approximately 175° C., and upon cooling the phenol condensation product, on account of its higher coefficient of expansion than that of the brass, tends to contact tightly on the ends of the brass ferrules.

We have found that we can improve the tightness of the joint by a heat treatment which comprises the following. The joints, after they are cooled from the molds, we immerse in oil at room temperature and bring the temperature of the oil to about 135° C., and then the oil and the joints are allowed to cool down slowly together. We find that joints which have developed leaks under air pressure, after this treatment of being heated in oil and allowed to cool slowly thereafter test tight, even after long periods have elapsed, and so far as we have been able to ascertain remain tight thereafter.

Oil is not the only substance which will serve, as any suitable insulating compound, for example, grease, may be used for this treatment.

We do not intend to be limited to the details shown and described.

We claim:—

1. In a high voltage cable joint exposed in use to man-hole water, a cable having metallic sheath parts spaced from each other a given distance, a pair of metal tubes with their adjacent ends spaced a given distance from each other and having their opposite ends belled in and provided with wiped joints with the sheath parts, a second pair of metal tubes having their adjacent ends spaced a given distance apart and their opposite ends telescopically engaging and having wiped joints with said first tube, the adjacent ends of said second tubes being provided with a plurality of external grooves and ridges, said grooves being relatively narrow to space the ridges relatively closely and the tops of the ridges being knurled, and a sleeve of insulation molded upon the grooved ends of said second tubes with the material of said sleeve of insulation in contact with the knurled tops of the ridges and extending around the corners of the ridges and down into said grooves into interlocking engagement with the grooves and ridges and with the knurling on the tops of the ridges, said sleeve connecting said second tubes and interrupting the metallic continuity thereof.

2. In a high voltage cable joint exposed in use to man-hole water the combination of a pair of metal tubes spaced apart endwise and disposed in axial alignment, each of said tubes having its end adjacent that of the other tube provided with a plurality of grooves and ridges, the tops of said ridges being knurled, and a sleeve of insulation molded upon the grooved ends of the tubes with the material of said sleeve of insulation in contact with the knurled tops of the ridges and extending around the corners of the ridges and down into said grooves and in interlocking engagement with the grooves and ridges and with the knurling on the tops of the ridges, said sleeve connecting said tubes and interrupting the metallic continuity thereof and the molding of said sleeve upon said knurled ridges providing a water tight and air tight joint between said sleeve and said tubes.

3. In a cable, a conductor, insulation for said conductor, a metal sheath discontinuous for the purpose of interrupting sheath current, a pair of metallic screens extending from the adjacent ends of the metal sheath and having their adjacent ends overlapping each other, a layer of insulation interposed between said overlapping ends, and a joining sleeve for joining the metal sheath ends mechanically, said joining sleeve including a section of insulation.

4. In a device of the character described, the combination with a sheathed cable having an interruption in the sheathing, of a plurality of insulation receiving sleeves adapted to bridge said interruption, said sleeves each comprising a plurality of separated metallic members positioned by insulating means, said interruption being completely bridged by metal parts.

5. In combination, a cable having metallic sheath parts with their adjacent ends spaced from each other a given distance, and a sleeve construction surrounding said cable and connecting the ends of said sheath parts together, said sleeve construction comprising a pair of metallic tubes with their adjacent ends spaced a given distance from each other and with their opposite ends belled in and joined to the sheath parts, a sleeve of insulation interposed between the adjacent ends of the tubes for rendering the sheath discontinuous as a metallic path and for connecting the ends of said tubes together mechanically, said tubes and sleeve of insulation being spaced radially outwardly of said sheath parts, and means discontinuous electrically between the sheath parts to prevent the disarrangement of the electrostatic stresses in the vicinity of the ends of the metallic tubes, said last means comprising a metallic ring embedded in said sleeve of insulation concentric with the ends of the metallic tubes.

6. In combination, a cable having metallic sheath parts with their adjacent ends spaced from each other a given distance, and a sleeve construction surrounding said cable and connecting the ends of said sheath parts together, said sleeve construction comprising a pair of metallic tubes with their adjacent ends spaced a given distance from each other and with their opposite ends belled in and joined to the sheath parts, a sleeve of insulation interposed between the adjacent ends of the tubes for rendering the sheath discontinuous as a metallic path and for connecting the ends of said tubes together mechanically, said tubes and sleeve of insulation being spaced radially outwardly of said sheath parts, means discontinuous electrically between the sheath parts to prevent the disarrangement of the electrostatic stresses in the vicinity of the break in the sheath, said means comprising continuations of the adjacent ends of the sheath parts tapered out within the sleeve construction at gradual angles to said sheath ends.

7. In combination, a conductor, insulation for said conductor, a metal sheath discontinuous for the purpose of interrupting sheath currents and having sheath parts spaced apart, a joining sleeve for joining the metal sheath parts mechanically, said joining sleeve including a pair of metal tubes spaced apart and having relatively closely spaced external grooves and ridges along their adjacent ends, the tops of said ridges being knurled and the knurling of the tops of said ridges forming overhanging lips along opposite edges of the tops of said ridges, and a sleeve of insulation molded upon the grooved ends of said tubes to connect said tubes and interrupt the metallic continuity thereof, said sleeve of insulation being molded against the knurled tops and the sides of said ridges and against the bottoms of said grooves and interlocking with the overhanging lips along the opposite edges of the ridges whereby, upon expansion, a sealing action is assured against the bottoms of said overhanging lips and against the sides of the ridges and, upon contraction, a sealing action is assured against the tops of the ridges and against the bottoms of said grooves.

HERMAN HALPERIN.
ALEXANDER P. THOMS.